May 18, 1943. P. MARTINOTTI 2,319,335
ROTATING ASSEMBLY
Filed June 14, 1939
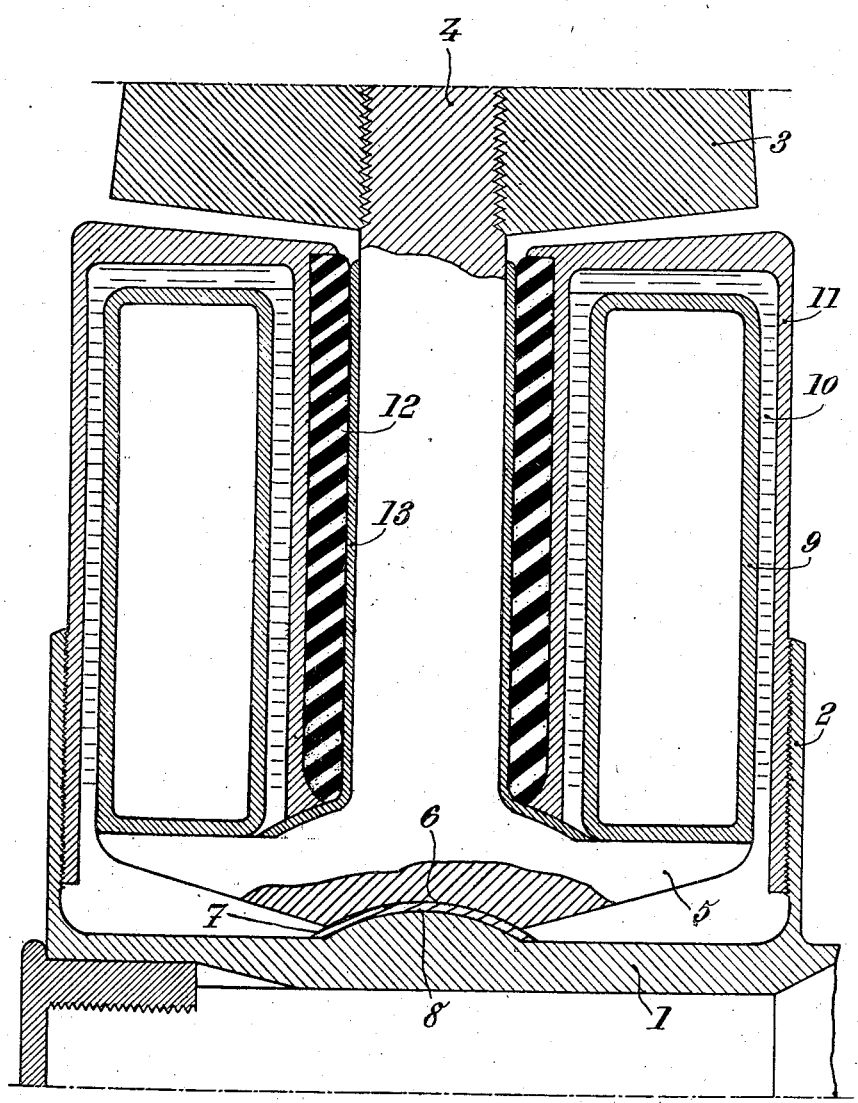
Inventor:
Pietro Martinotti,
Bailey & Carson
Attorneys Patented May 18, 1943

2,319,335

UNITED STATES PATENT OFFICE 2,319,335

ROTATING ASSEMBLY

Pietro Martinotti, Paris, France; vested in the Alien Property Custodian

Application June 14, 1939, Serial No. 279,181
In France November 18, 1938

5 Claims. (Cl. 170—162)

The present invention relates to hubs for airscrews of the variable pitch and oscillating blade type.

The object of the invention is to provide a hub of this type which is better adapted to meet the requirements of practice than those used up to the present time.

According to an essential feature of the present invention, the hub is provided, on the periphery thereof and at equal angular intervals, with a plurality of radial bodies corresponding each to a blade of the propeller or airscrew, and each blade is connected to the hub through a trunnion or journal cooperating with a float immersed in a mass of mercury present in a reservoir fixed to the radial body which corresponds with said blade.

Owing to this arrangement, the mass of mercury, which has the same rotating movement as the hub, is subjected to the action of the centrifugal force, whereby the resulting hydrostatic pressures exert, upon the float, a thrust toward the axis of revolution which will be equal to, or greater than, the centrifugal force developed by the blade of the propeller.

Other features of the present invention will result from the following detailed description of some specific embodiments thereof.

A preferred embodiment of the present invention is described, with reference to the accompanying drawing which shows a diagrammatic sectional view, in an axial plane, of one half of a propeller hub made according to the present invention.

In the embodiment illustrated by the drawing, the hub 1 of the propeller is provided, in the known manner, along its periphery and at regular intervals, with radial bodies 2 corresponding each to a propeller blade 3.

Each blade is mounted, for instance by screw-threads, as shown by the drawing, on a trunnion or journal 4, of circular section, provided, at its lower or inner end, engaged in the corresponding radial body 2, with an enlarged end, or circular shoulder 5, of a diameter slightly smaller than the inner diameter of radial body 2. On its lower face, end part 5 is provided with a cup-shaped spherical recess 6, bearing, with the interposition of a lining 7, upon a boss of corresponding shape 8 provided on the periphery of the body 1 of the hub.

The contact between end part 5 and the body 1 of the hub is ensured through the medium of a float 9 immersed in a mass of mercury 10 contained in an annular reservoir 11 fixed, by screwing or otherwise, on radial body 2. This float, which is hollowed out, can be utilized such as it is or it may be filled with a light material, such as wood for instance, so as to enable it efficiently to withstand all pressures.

Between trunnion 4 and the inner wall of annular reservoir 11, I provide a sleeve 12 of an elastic material such as rubber, which is in contact on the one hand with said inner wall and, on the other hand, with a metallic lining 13 surrounding trunnion 4.

When the hub of the propeller is rotating, the mass 10 of mercury comes, under the action of the centrifugal force, to accumulate against the outer wall of reservoir 11. This mass of mercury therefore exerts a thrust on float 9, which thrust has for its effect to maintain end part 5 applied against hub 1.

This does not prevent blade 3 and the trunnion 4 by which it is supported to turn about their common radial axis, under the action of any device for controlling the variation of pitch of the propeller. Furthermore, as rubber mass 12 is compressible, blade 3 is not rigidly mounted on the propeller hub, whereby this blade can oscillate in such manner as to assume the desired position for absorbing and eliminating any vibration.

As substantially most metals except steel and iron are attacked in time by mercury, all the non-ferrous pieces which would be in contact with the mercury must be coated with a layer of cast iron, preferably by immersing them in a bath of molten cast iron.

The propeller hub above described has, among other advantages over hubs of known types, that of eliminating the necessity of any ball or roller bearing or thrust bearing. Furthermore, it eliminates most of the friction stresses, while being very simple to manufacture.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A propeller blade and hub construction comprising a propeller blade including a root, a propeller hub, ball and socket means mounting said root on said hub, a liquid carrying chamber mounted upon said hub for rotation therewith, and float means attached to said root and mounted in said chamber, said root including a shaft extending from said blade and bearing upon said hub and forming a part of said ball and socket means, said float means being secured to said shaft.

2. In a device of the kind described, a propeller blade, member and a hub member, a liquid carrying receptacle of annular shape mounted upon said hub member, said receptacle being open toward the axis of said hub member and being closed at its radial outer side, said blade member having a shaft surrounded by said receptacle and bearing upon said hub member, swivel means on said members mounting said shaft on said hub member for relative universal movement, floats mounted upon said shaft and extending into said receptacle, said liquid containing receptacle including mercury as a liquid, and rubber packing interposed between said receptacle and said shaft.

3. A hub system for variable pitch propellers comprising, in combination, a hub rotatable about an axis, an element extending radially outwardly from said hub, an annular vessel carried by said hub for rotation therewith and surrounding a portion of said radial element, means swivelly mounting said element on said hub and permitting outward radial movement of said element, said swivel means being disposed radially inwardly of said annular vessel, a liquid mass in said vessel, a float carried by said radial element and engaged in said vessel so as to bear on said liquid mass for transmitting to said element the inward radial thrust of said liquid mass, and elastic packing interposed between said radial element and said annular vessel.

4. A rotary system which comprises, a hub rotatable about an axis, at least one radial element adapted to rest on said hub, the juncture between said element and said hub being formed as swivel means permitting outward radial movement of said element but limiting inward radial movement of said element, a chamber mounted upon said hub for rotation therewith, and float means attached to said radial element and disposed in said chamber, said chamber containing a liquid capable of supporting said float in spaced relation to the walls of said chamber.

5. A propeller blade and hub construction, comprising a propeller hub, a propeller blade including a root adapted to rest on said hub, the juncture between said root and said hub being formed as swivel means permitting outward radial movement of said blade but limiting inward radial movement of said blade, a chamber mounted upon said hub for rotation therewith, and float means attached to said root and disposed in said chamber, said chamber containing a liquid capable of supporting said float in spaced relation to the walls of said chamber.

PIETRO MARTINOTTI.